Figure 1:
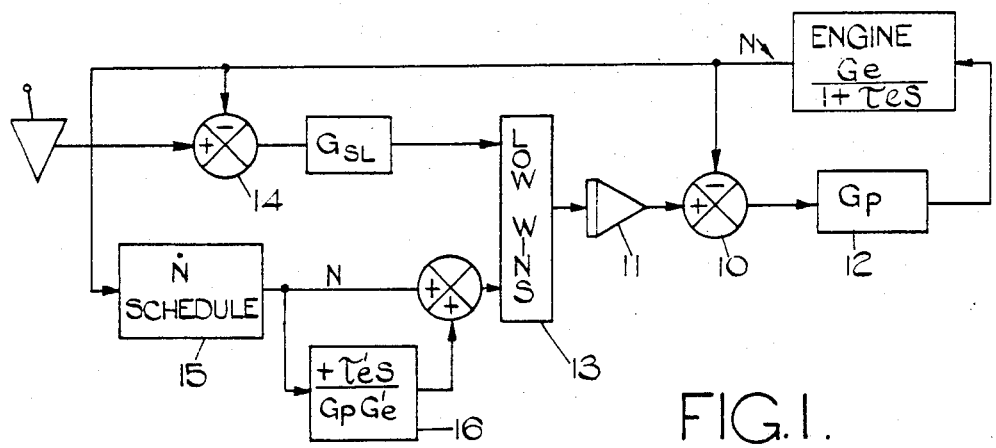

United States Patent [19]

Fitzmaurice

[11] Patent Number: 4,543,782
[45] Date of Patent: Oct. 1, 1985

[54] GAS TURBINE ENGINE FUEL CONTROL SYSTEMS

[75] Inventor: Ian P. Fitzmaurice, Solihull, England

[73] Assignee: Lucas Industries, Birmingham, England

[21] Appl. No.: 494,995

[22] Filed: May 16, 1983

[30] Foreign Application Priority Data

May 21, 1982 [GB] United Kingdom ............... 8214828

[51] Int. Cl.$^4$ .............................................. F02C 9/28
[52] U.S. Cl. ............................................... 60/39.281
[58] Field of Search ..................................... 60/39.281

[56] References Cited

U.S. PATENT DOCUMENTS

| | | | |
|---|---|---|---|
| 3,520,133 | 7/1970 | Loft et al. | 60/39.281 |
| 3,844,114 | 10/1974 | Nonnenmann et al. | 60/39.281 |
| 3,982,389 | 9/1976 | Maher | 60/39.281 |
| 4,100,731 | 7/1978 | Jones et al. | 60/39.281 |
| 4,303,976 | 12/1981 | Joby | 60/39.281 |
| 4,432,201 | 2/1984 | Hawes | 60/39.161 |

Primary Examiner—Louis J. Casaregola
Attorney, Agent, or Firm—Trexler, Bushnell & Wolters, Ltd.

[57] ABSTRACT

A gas turbine engine fuel control system includes a transducer N which provides a signal representing engine speed. An Ṅ schedule signal generator receives the N signal and generates an acceleration limit signal which is used during acceleration as a limiting signal. To overcome problems of droop inherent, in such systems a correction signal generated by a function generator is added to the output of the Ṅ schedule signal generator. The correction signal is at least in part dependent on the rate of change of the limit signal.

7 Claims, 5 Drawing Figures

GAS TURBINE ENGINE FUEL CONTROL SYSTEMS

This invention relates to gas turbine engine fuel control systems which provide control of fuel flow both during steady running conditions and during acceleration.

One known form of control system is the so-called slave-datum system. In such a system a "fast" servo loop is established in which a slave datum signal is compared with an actual signal representing an engine parameter, usually engine speed although other parameters can be employed especially when the engine in question is being used as a gas generator to drive some external load. The error between the datum and the actual signal is used to control the fuel flow to the engine. The slave datum signal is derived in steady state conditions by integrating the difference between the actual signal and a desired value thereof. In acceleration a variable limit signal is substituted for the difference signal which is integrated and this limit signal thus represents a desired rate of change of the parameter.

With systems of this type, the problem of "droop" appears during acceleration, that is, because of the dynamic characteristics of the engine and the fuel flow control device, the actual rate of change of the parameter never actually achieves the desired rate of change. In the past, this "droop" has been allowed for in determining the limit signal schedule, that is to say the limit signal actually used has a higher level than that which actually represents the desired rate of change. This inevitably involves many compromises in determining the limit signal schedule and it is an object of the present invention to provide a system in which such compromises are rendered unnecessary.

However, the invention is applicable not only to slave datum systems but also to systems in which the fuel is controlled in accordance with the error between the scheduled limit signal and the measured rate of change of the engine speed.

In accordance with the invention there is provided a gas turbine engine fuel control comprising a transducer means responsive to an operational variable of the engine and providing a feedback signal representing the actual value of said variable, a demand signal setting means providing a demand signal representing a desired value of said variable, comparator means comparing said demand signal with said feedback signal and providing an error signal representing the error between the demanded and actual values of said variable, limit signal generating means connected to said transducer and providing a limit signal representing the maximum permitted rate of change of the variable, limit signal correction means connected to said limit signal generator and providing a corrected limit signal by adding to said limit signal a correction signal dependent at least in part on the rate of change of said limit signal, signal selection means connected to said limit signal correction means and to said comparator means and providing a control signal which is the lesser of the error signal the corrected limit signal and servo fuel control means connected to the signal selection means and to the transducer means and operating to control the fuel flow to the engine such that the rate of change of said variable is determined by said control signal.

In the accompanying drawings:

FIGS. 1 to 5 are diagrammatic representations of five examples of fuel control systems in accordance with the invention.

Referring firstly to FIG. 1, there is shown therein, an example of the application of the present invention to a simple slave datum fuel control system. The basic system utilises a "fast loop" including an error signal generator 10 which compares an actual engine speed signal from a transducer N with the output of an integrator 11 and provides an input to an electro-mechanical fuel control 12 having a simple proportional-only transfer function, that is the rate of fuel flow to the engine is directly proportional to the input signal.

The input to the integrator 11 is via a low wins gate 13, one input to which is from a second error signal generating means 14 which produces a signal representing the error between the actual engine speed signal and a demand speed signal. This provides a "slow loop" which controls the engine speed in steady running conditions, in which the output of the second error signal generating means is held at zero in known manner. The other input to the low wins gate 13 controls acceleration and effectively operates to set upper and lower limits to the signal which is input to the integrator. In the arrangement shown the limit signals are generated by Ṅ schedule signal generator 15 which receives as input only the engine actual speed signal, although the schedule can be generated as a function of other engine variables, such as temperature and compressor pressure signals and ambient conditions. The generator 15 provides a signal which represents the exact rate of change of engine speed to be permitted at the given engine speed and no allowance is made when programming the generator for dynamic effects which will in practice prevent the actual rate of range from achieving this desired rate of change. To obtain the necessary conpensation, and thereby avoid the problem of "droop", a correction signal generator 16 is incorporated and provides a signal which takes into account the engine and fuel system transfer function constants. Thus, in the system shown the correction signal generator has a transfer function of the form:

$$(1+\tau'_E S)/(Gp\, G_{E'}),$$

where $\tau'_E$ is an estimate of the engine time constant, $Gp$ is the fuel system gain, $G_E'$ is the estimated engine gain, the engine having a transfer function of the form $G_E/(1+\tau_E S)$ and $S$ is the differential operator. The terms $G_E'$ and $\tau'_E$ can be established empirically for any particular engine, whereas the term $Gp$ is established, during the design of the fuel control, at a value to provide dead beat operation of the fuel control/engine fast loop.

Figure 2:
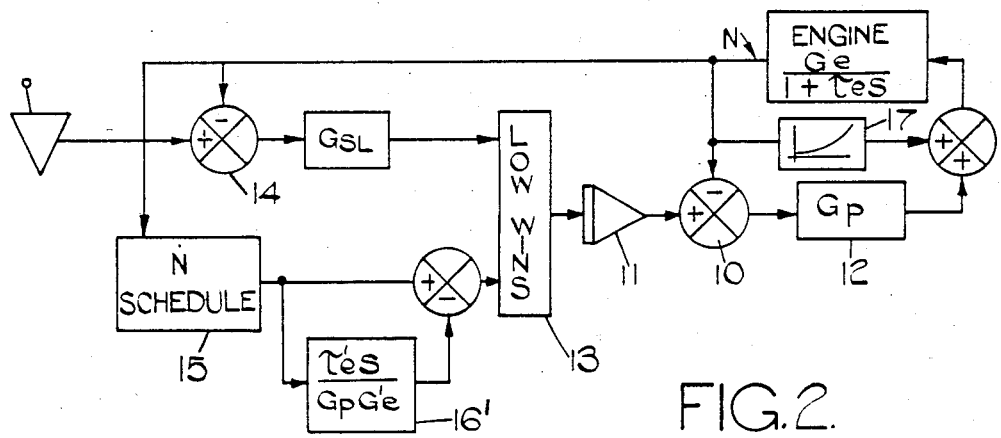

Turning now to FIG. 2, the fast loop is modified by the addition of an additional function generator 17 which adds to the output of the control 12 a term which is non-linearly related to engine speed. As a result the output of the control 12 becomes a trim term which effectively varies the fuel flow to the engine above or below that determined by the generator 17. With such an arrangement the correction signal generator 16' is required to have a transfer function in the form $$\tau'_E S/Gp\cdot G_{E'}$$

Figure 3:
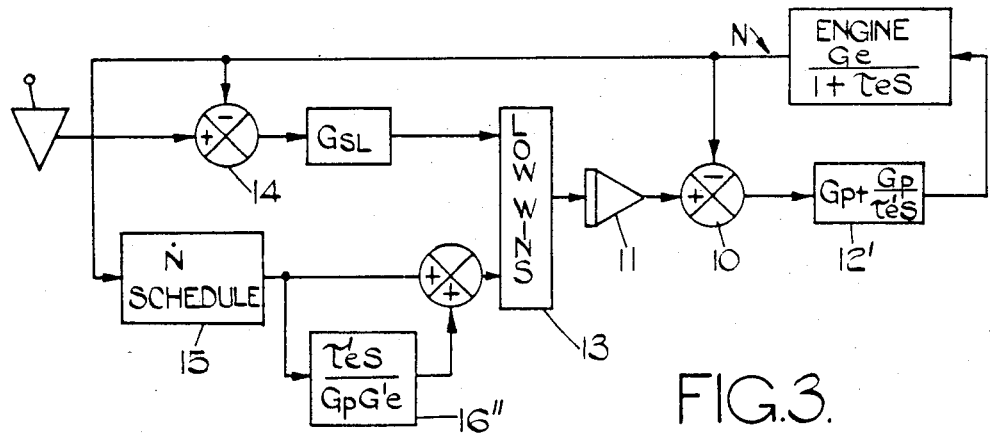

Turning now to FIG. 3, the control system shown therein differs from that shown in FIG. 1 in that the control 12' is a proportional-plus-integral control instead of a simple proportional control. In this case the transfer function of the correction signal generator is also $(\tau'_e S / Gp\, G_e')$, where $\tau'_e$ and $G_e'$ are estimated values of the engine time constant and gain.

Figure 4:
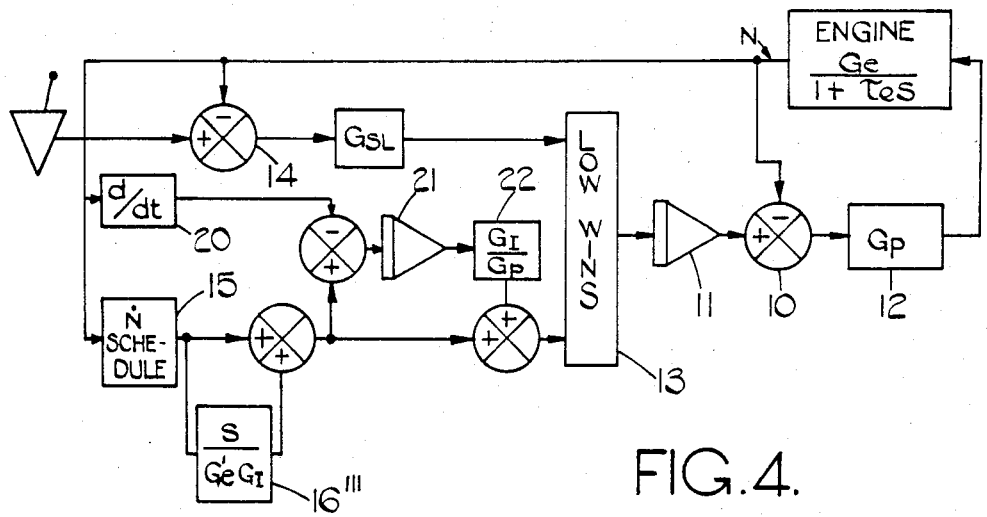

Turning now to FIG. 4 the fast loop includes a simple proportional only control 12 with a transfer function $$Gp = \alpha E'_e / G_e')$$

and the correction signal generator 16''' has a transfer function $(S/G_e'\, GI)$ where $G_I$ is given by the expression $(\alpha/G_e')$
where $\alpha$ is a constant. In addition another correction is derived by utilising a differentiator 20 to produce a signal proportional to the actual rate of change of engine speed, comparing this signal with the connected Ndot schedule signal, integrating the Ndot error signal thus derived in an integrator 21, applying this integrator output to a function generator 22 with a transfer function $(GI/Gp)$ and adding the output of generator 22 to the corrected Ndot schedule signal. This arrangement has the advantage of having no integrator in the fast loop whilst still effectively providing a proportional-plus-integral engine speed control.

Figure 5:
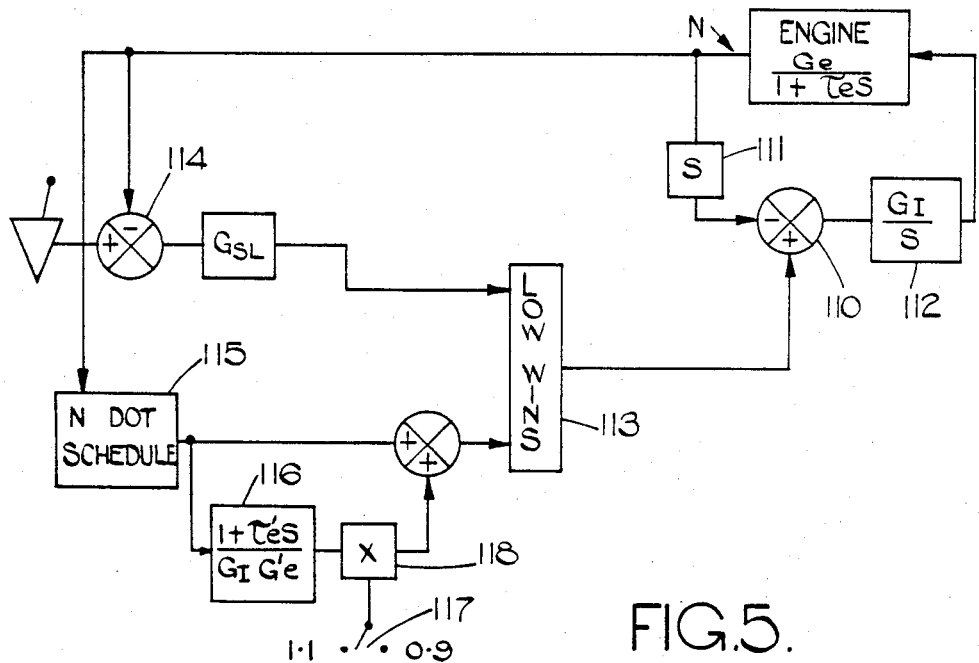

Turning finally to FIG. 5, the control system shown therein is not a slave datum system, but has a main loop including a control 112 having an integral transfer function $(GI/S)$, and error signal generator 110 which provides the input to the control 112 and which generates an Ndot error signal by comparing an Ndot demand signal with an Ndot actual signal from a differentiator 111. The Ndot demand signal is routed to the generator 110 either from a speed error signal generator 114 or from the Ndot acceleration schedule generator 115 via a low wins gate 113. The Ndot schedule generator 115 has its output connected to a correction signal generator 116 which has a transfer function.

$$(1 + \tau'_e S / G_I\, G_e')$$

and which has its output summed with the output of the generator 115 before application to the low wins gate.

In equilibrium the output of generator 114 is zero so that the control 112 regulates the fuel supply to the engine to maintain the engine speed constant. In acceleration the corrected Ndot schedule signal wins the gate 113 and the actual acceleration is thus regulated in accordance with this signal.

The control of FIG. 5 also includes a switch 117 and a multiplier 118 connected to multiply the correction signal by 0.9 or 1.1 according to the position of switch 117 in order to enable the best matched correction to be selected.

It will be noted that in every case the correction which is added to the Ṅ limit signal is dependent at least in part, on the rate of change of the Ṅ limit signal.

I claim:

1. A gas turbine engine fuel control comprising a transducer means responsive to an operational variable of the engine and providing a feedback signal representing the acutal value of said variable, a demand signal setting means providing a demand signal representing a desired value of said variable, comparator means comparing said demand signal with said feedback signal and providing an error signal representing the error between the demanded and actual values of said variable, limit signal generating means connected to said transducer and providing a limit signal representing the maximum permitted rate of change of the variable, correction signal generator means connected to said limit signal generating means and providing a correction signal dependent at least in part on the rate of change of said limit signal, limit signal correcting means connected to said limit signal generator and to said correction signal generator means and providing a corrected signal dependent at least in part on the rate of change of said limit signal, signal selection means connected to said limit signal correction means and to said comparator means and providing a control signal which is the lesser of the error signal and the corrected limit signal, and servo fuel control means connected to said signal selection means and to the transducer means and operating to control the fuel flow to the engine such that the rate of change of said variable is determined by said control signal.

2. A fuel control as claimed in claim 1 in which said servo fuel control means comprises an integrator connected to said signal selection means to receive said control signal as its input, a further comparator means comparing the output of said integrator with said feedback signal and an electromechanical fuel control device controlling fuel flow to the engine in accordance with the further comparator means output.

3. A fuel control as claimed in claim 2 in which the electromechanical fuel control device has a linear characteristic, i.e. it provides a fuel flow directly proportional to the further comparator means output; said correction means comprising a function generator having a transfer characteristic $(1 + \tau'_e S)/G'$ where S is the differential operator, $\tau'_e$ is an estimate of the time constant of the engine and G' is an estimate of the gain of the combined fuel control device, engine and transducer means, and means for adding the output of the function generator to the limit signal.

4. A fuel control as claimed in claim 2 in which said electromechanical fuel control device includes means for controlling fuel flow in dependence on the transducer output, said further comparator means output providing a trim input to said control device; said correction means comprising a function generator having a transfer function $\tau'_e S / G'$ where S is the differential operator, $\tau'_e$ is an estimate of the time constant of the engine and G' is an estimate of the gain of the combined fuel control device, engine and transducer means, and means for adding the output of the function generator to the limit signal.

5. A fuel control as claimed in claim 2 in which the electromechanical fuel control device has a proportional-plus-integral characteristic; said correction means comprising function generator having a transfer function $\tau'_e S / G'$ where S is the differential operator, $\tau'_e$ is an estimate of the time constant of the engine and G' is an estimate of the gain of the combined fuel control device, engine and transducer means, and means for adding the output of the function generator to the limit signal.

6. A fuel control as claimed in claim 1 further comprising a differentiator connected to said transducer and providing a rate of change signal representing the rate of change of the variable, an integrator connected to integrate the error between the output of the differentiator and said corrected limit signal, and means for adding the output of said integrator to the corrected limit signal.

7. A fuel control as claimed in claim 1, in which said servo fuel control means comprises a differentiator connected to the transducer, a comparator comparing the output of the integrator and the control signal, and an electromechanical fuel control device having an integral characteristic.

* * * * *